No. 618,553. Patented Jan. 31, 1899.
S. L. ALLEN.
CULTIVATOR IMPLEMENT.
(Application filed May 12, 1898.)
(No Model.) 5 Sheets—Sheet 1.

Witnesses.
J. J. Cross
J. Henderson

Inventor:
Samuel L. Allen,
by  /s/ Petit
Attorney.

No. 618,553. Patented Jan. 31, 1899.
S. L. ALLEN.
CULTIVATOR IMPLEMENT.
(Application filed May 12, 1898.)
(No Model.) 5 Sheets—Sheet 2.

Witnesses
J. T. Cross
J. Henderson

Inventor
Samuel L. Allen,
Attorney.

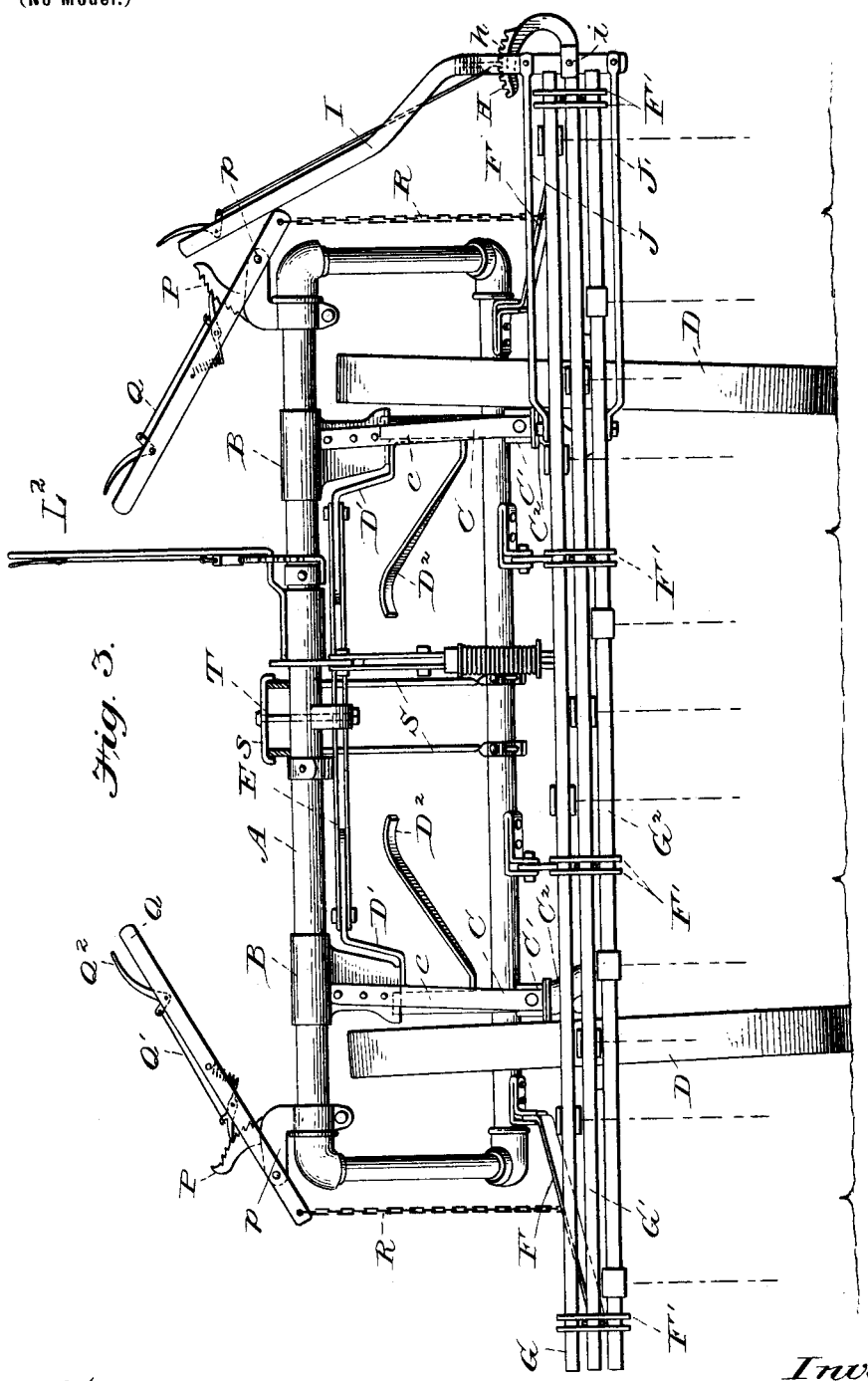

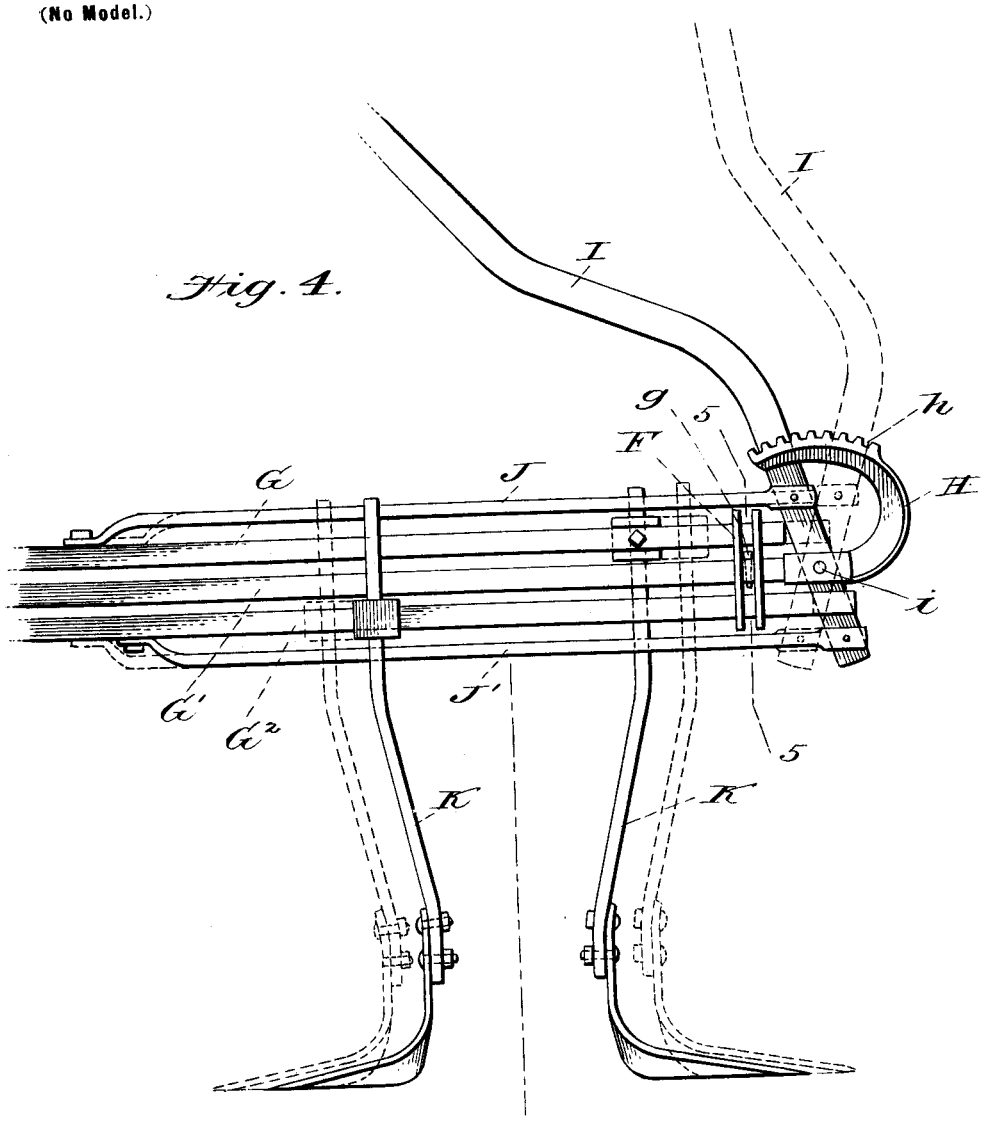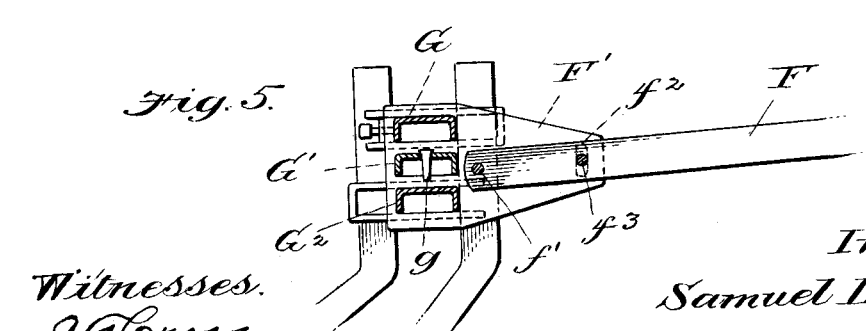

No. 618,553. Patented Jan. 31, 1899.
S. L. ALLEN.
CULTIVATOR IMPLEMENT.
(Application filed May 12, 1898.)
(No Model.) 5 Sheets—Sheet 5.
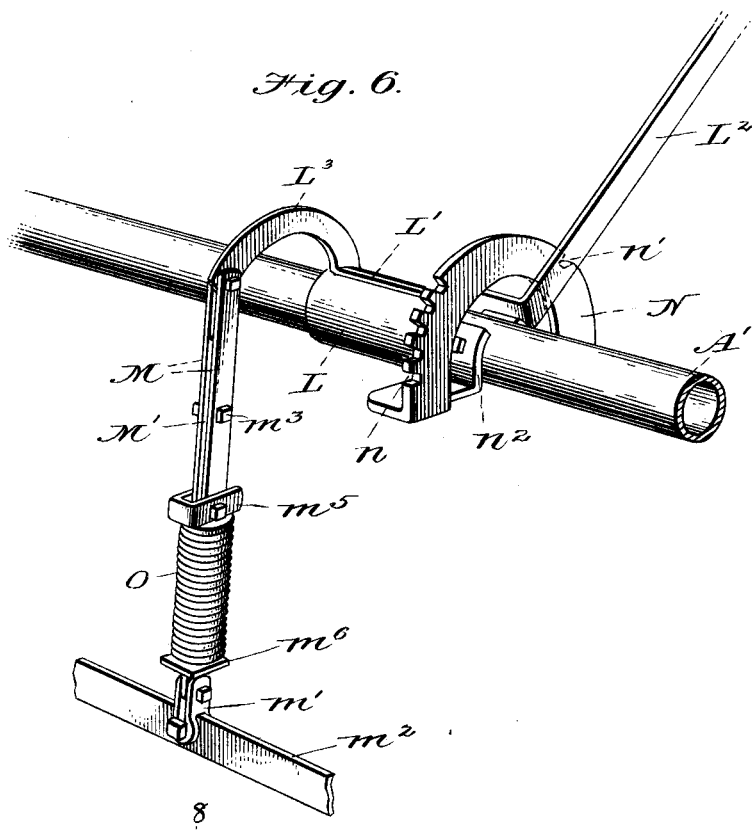
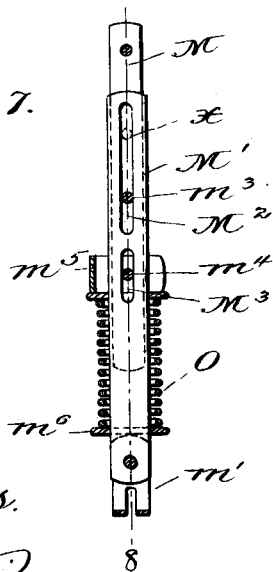
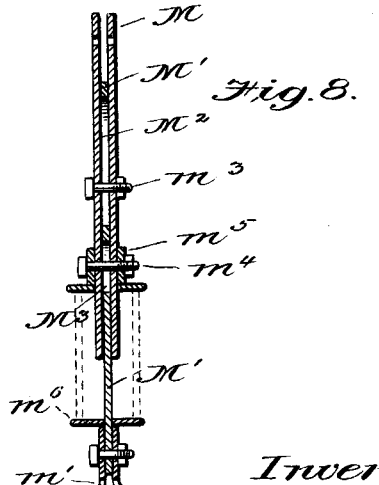

UNITED STATES PATENT OFFICE.

SAMUEL L. ALLEN, OF MOORESTOWN, NEW JERSEY.

CULTIVATOR IMPLEMENT.

SPECIFICATION forming part of Letters Patent No. 618,553, dated January 31, 1899.

Application filed May 12, 1898. Serial No. 680,441. (No model.)

*To all whom it may concern:*

Be it known that I, SAMUEL L. ALLEN, a citizen of the United States, and a resident of Moorestown, county of Burlington, State of New Jersey, have invented certain new and useful Improvements in Cultivator Implements, of which the following is a full, clear, and exact description, reference being had to the accompanying drawings, forming part of this specification.

My invention relates to certain improvements in cultivator implements, and more particularly to riding-cultivators of the class which are adapted to straddle and work a number of rows at a time.

The principal object of my invention is to provide an improved form of horse-machine for the cultivation of a number of varieties of crops.

A further object of my invention is to provide means for the ready lateral adjustment of the teeth and their carrying-bars, so that the teeth may be brought closer to or farther away from the rows of plants at the will of the operator.

A still further object of the invention is to provide improved means for adjusting and regulating the downward pressure exerted upon the teeth and also means for regulating the depth of penetration of the soil.

A still further object of my invention is to provide an improved form of frame for machines of this character which will be simple in construction, composed of as few parts as possible, cheap to manufacture, but at the same time having great strength and durability and presenting a pleasing appearance.

My invention has also certain other objects, uses, and advantages, which will be clear from the construction hereinafter more fully described, and particularly pointed out in the claims.

In order to enable others skilled in the art to which my invention appertains to make and use the same, I will proceed to describe it, reference being had to the accompanying drawings, in which—

Figure 1:
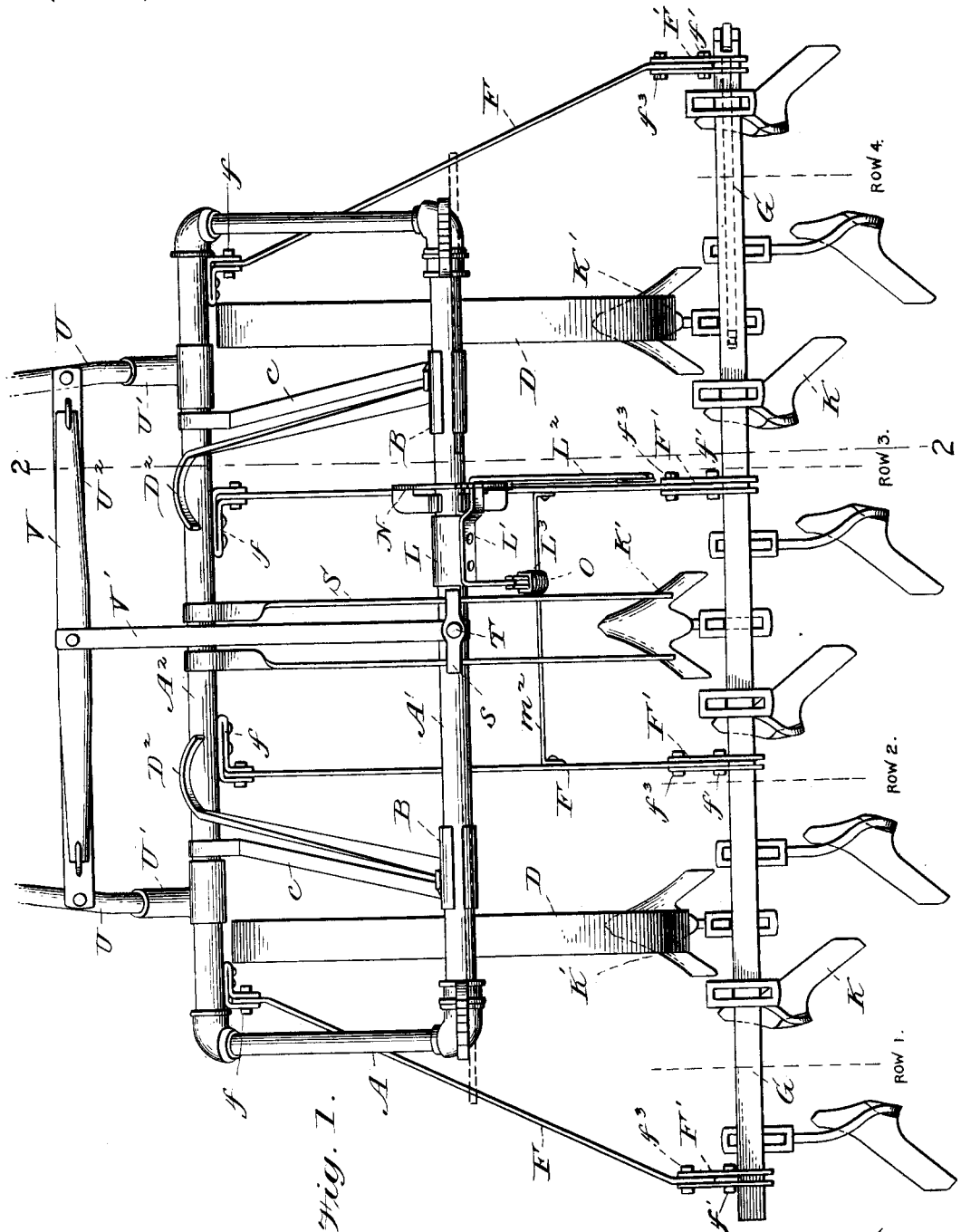
Figure 2:
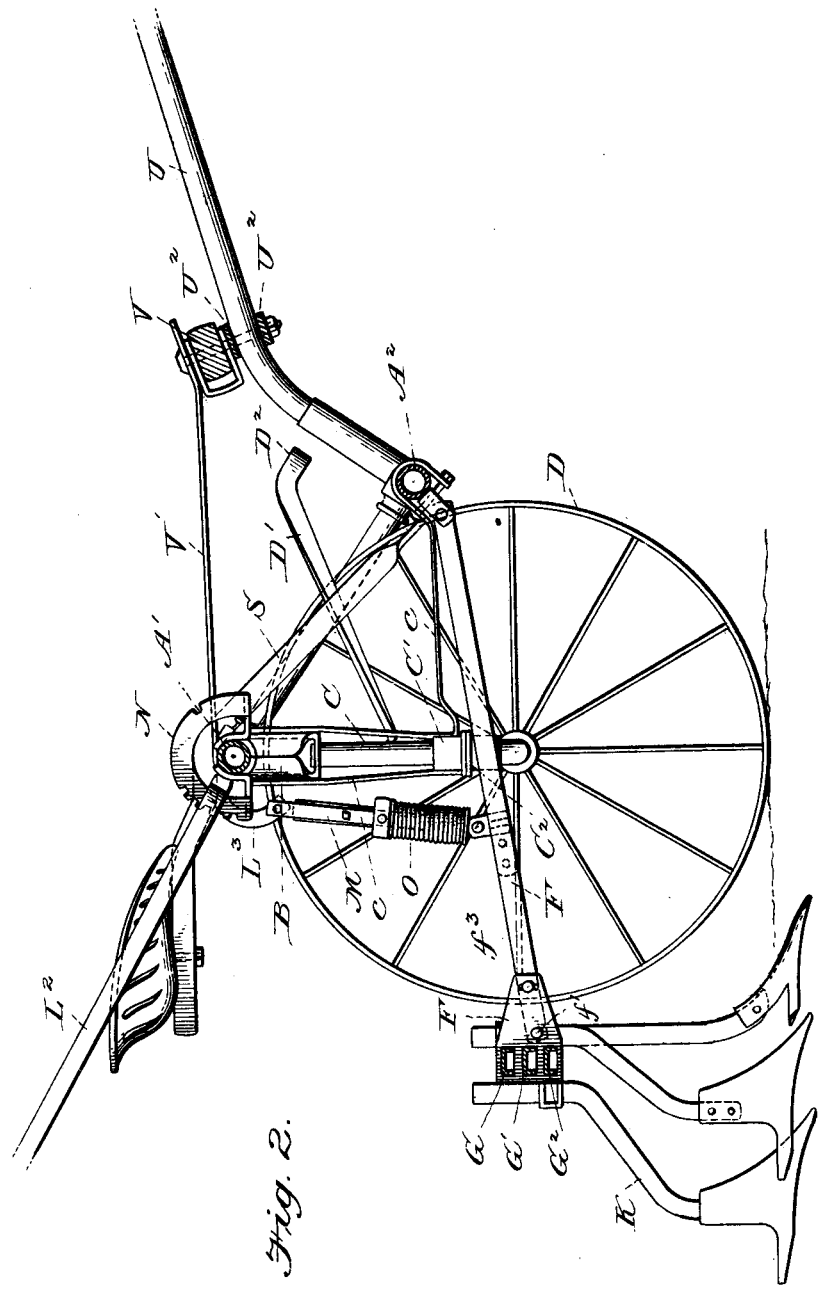

Figure 1 is a plan view of an implement embodying my invention. Fig. 2 is a side elevation, partly in section, taken about on the line 2 2 of Fig. 1. Fig. 3 is an end elevation of the same. Fig. 4 is an enlarged detail end elevation of a portion of the tool-carrying bars and the mechanism for adjusting them laterally to regulate the distance between the teeth, a different position for the parts being shown by dotted lines. Fig. 5 is a detail sectional view taken about on the line 5 5, Fig. 4, showing the twin supporting-plates for holding the tool-bars, which form a part of the tool-carrying frame. Fig. 6 is a detail perspective view of the elevating mechanism and tension device for exerting and regulating the downward pressure upon the teeth-carrying frame. Fig. 7 is a vertical sectional view of the tension device. Fig. 8 is a transverse vertical sectional view of the same, taken about on the line 8 8 of Fig. 7.

In the drawings, A designates the main frame of my machine, which consists, substantially, of a rectangular frame made of hollow tubing of any suitable material, such as iron or steel, secured together at its corners by suitable elbows, which may be screw-threaded, brazed, or otherwise secured to the said tubing, as desired. Secured on the rod $A'$ of the said frame A are the clamps B, which are adjustable laterally thereon by means of bolts, as illustrated, and have mounted in their lower ends pivot-bars C, which are bent at substantially right angles at their lower ends to form axles for the supporting-wheels D. The construction of the pivot-bar C and the manner of mounting the same in the clamps B are substantially the same as that described and shown in my application for Letters Patent, Serial No. 675,678, filed March 30, 1898, and therefore need not be described specifically. Vertical brace-rods $c$ are provided on each side of the pivot-bar C, the upper ends of which are secured to the clamp B and the lower ends thereof being secured to a block $C'$, supported by the box $C^2$, carried by the lower end of the pivot-bar C. The forward braces $c$ are extended forward and secured by means of bolts or otherwise to the bar $A^2$ of the frame A for the purpose of more firmly bracing the pivot-supports and the general framework of my machine.

$D'$ designates the guiding-arms, the lower ends of which terminate in foot-rests $D^2$ and the upper ends of which are connected to the twin connecting-bars E, the construction and operation of which are also substantially the same as that described in my application above mentioned.

Secured in brackets $f$, bolted to the front frame-bar $A^2$, are the bars F, which extend rearwardly and carry on their rear ends the twin supporting-plates F', provided with slots for the reception of the transverse tool-bars G, G', and $G^2$, the same constituting what I term the "tool-carrying frame." The upper and lower bars G $G^2$ are loosely mounted in the supporting-plates F' and are adapted to slide freely therein. The mechanism for effecting the movement of these bars will be hereinafter described. The intermediate bar G' is stationary, being rigidly secured to the supporting-plate F by means of a pin $g$, inserted through said bar between the twin plates F', as more clearly illustrated in Fig. 5 of the drawings. From this description it will be readily seen that the intermediate bar is held against lateral movement, while the upper and lower bars are capable of lateral movement in either direction.

On one end of the stationary tool-bar G' is secured a segmental rack H, provided with a series of teeth $h$, and pivoted to the lower end of said rack is a hand-lever I, provided with the usual spring-pawl mechanism, adapted to engage the teeth $h$ of the rack H. To the lever I, at a point a short distance below the tool-bar $G^2$ and at a point a short distance above the tool-bar G, are pivoted rods J, the other ends of said rods J being bolted to the tool-bars G' and G, respectively, as illustrated more clearly in Fig. 4 of the drawings.

The teeth K are secured to the upper and lower bars G $G^2$ by means of any suitable clamp and are positioned on said bar so as to be an equal distance on each side of the rows of plants, as clearly illustrated in Figs. 1 and 4 of the drawings, the dotted lines representing the rows. The teeth K' are secured to the intermediate stationary bar G' and are positioned so as to operate centrally between the rows. These teeth can be adjusted so as to accommodate rows of different widths, and after they are once set they are supposed to be in proper working position for all varieties of crops whose rows are of the same width. The teeth K, which straddle the rows, are capable of lateral adjustment, so as to bring them either closer to or farther away from the rows of plants, by means of shifting the upper and lower tool-bars in opposite directions simultaneously, this being accomplished by means of the hand-lever I, which is pivoted at $i$ to the stationary bar G', and segment H', having pivoted to its lower extending end the rod J', which is connected at its free end with the lower tool-bar $G^2$, and the upper rod J, pivoted at an equal distance above the pivotal point $i$ of the said lever I and having its free end connected to the upper tool-rod G. Thus when the rod I is disengaged from the rack $h$ by means of its spring-pawl and shifted in one direction the rods J and J' pull and push, respectively, on the bars G and $G^2$ and shift them in opposite directions, the spring-pawl serving to engage the rack, and hold them in any desired position, and thereby bring the teeth K either closer to or farther away from the rows of plants, as may be desired by the operator, without removing or unclamping any of the teeth on the said bars.

The twin plates F', which support the tool-bars, are pivoted to the bars F at $f'$ in about the center of said supporting-plates. The rear ends of the plates F' are provided with slots $f^2$, through which pass the bolts $f^3$ and by means of which the pitch of the teeth may be changed so as to bring them level with the ground or inclined slightly in either a forward or backward direction, as may be desired. All that is necessary in order to accomplish this is to loosen up the bolts $f^3$ and press down on the twin plates F', the bolt $f'$ acting as a pivot upon which the plates F' swing and the slots $f^2$ permitting the same to be swung in either direction, and when the desired pitch is attained the bolts $f^3$ are tightened up.

Mounted on the frame-bar A', slightly to one side of the center thereof, is a loose sleeve L, having bolted thereto a lever L', one end of which is bent to form a handle-lever $L^2$ and the other end of which is bent to form a sector $L^3$ for attachment to the vertical rods M of the tension device, the construction of which will presently be described. To the right of the sleeve L is a segment N, provided with a series of notches $n$ on one side and a single notch $n'$ on its other, the ends of said segment N being bent at right angles and toward the frame A' in such a manner as to form feet $n^2$, by means of which it is securely bolted to the said frame-rod A', as clearly illustrated in Fig. 6 of the drawings. The hand-lever $L^2$ is provided with the usual spring-pawl, which is adapted to engage the notches of the segment N. The rod M' is secured by means of a suitable clip $m'$ to a transverse bar $m^2$, which is connected to the frame-bars F, as illustrated in Fig. 1. The upper end of the rod M' is provided with a slot $M^2$ for the reception of the bolt $m^3$, which passes through the bars M. A second slot $M^3$ is provided a short distance below the slot $M^2$ in the said rod, through which passes the bolt $m^4$, said bolt also passing through the bars M and through a washer $m^5$. On the lower end of the bar M' is rigidly secured a washer $m^6$, between which and the washer $m^5$ is interposed a tension-spring O. In the operation of this mechanism the handle-bar $L^2$, which is provided with a spring-pawl adapted to the notches $n$ in the segment N and having the usual wire connection with the said handle $L^2$ for disengaging the said pawl, is operated, the sleeve L turning loosely upon the frame-bar A', and the sector $L^3$, exerting a downward pressure on the bars M, slightly compresses the spring O until the bolt $m^4$ reaches the lower end of the slot $M^3$, while the pressure is then direct on the bar $m'$, which, being connected to the brace-bar $m^2$, carried by the bars F of the tool-carrying frame, exerts suitable pressure on the teeth, at the same time admitting of a certain resiliency in case the teeth come in contact with obstructions, such as stones or stumps. The farther down the lever $L^2$ is thrown the greater will be the pressure exerted upon the teeth-carrying frame, and when it is desired to lift the teeth entirely free of the ground, as in transportation elsewhere, the lever L is thrown around until its spring-pawl engages the notch $n'$ of the segment N. The above-described mechanism admits of a direct and positive pressure being applied to the tool-carrying frame, which is within easy reach of the driver or operator, and at the same time gives yielding tension to the teeth. If it is desired to work in very stiff soil, where great tension may be required to keep the teeth penetrated in the said soil, I provide a heavier and stronger tension-spring, as O, and place the bolt $m^4$, carrying the washer $m$, in the upper slot $M^3$ of the bar $M'$. This bolt will then take the position assumed by the bolt $m^3$, and the bolt $m^3$ will be in the position illustrated at $x$ in dotted lines in Fig. 7. The operation will be the same as before described, the only difference being the substitution of a spring of increased tension.

In order to regulate the depth of penetration of the teeth and limit the downward movement of the teeth-carrying frame, I provide on the ends of the main frame-bar $A'$ a segmental ratchet P, provided with depending lugs, by means of which it may be securely bolted to said frame-bar $A'$. Extending laterally from said segment, on its outer edges, is a lug $p$, to which is pivoted a hand-lever Q, which carries a spring-pressed pawl adapted to engage the ratchet-teeth on the segment P and be operated by means of a wire $Q'$, connected with an operating-handle $Q^2$. To the lower end of the lever Q, I secure a chain R, the other end of which is connected with the outer bars F of the tool-carrying frame. Thus it will be seen that the driver by operating the lever Q can regulate the downward movement of the teeth-carrying frame by means of the ratchet-and-pawl mechanism just described. This mechanism also tends to stiffen the tool-carrying frame when the proper pressure is exerted on the said tool-frame by means of its tension device and prevent any sagging or tilting of said tool-carrying frame.

S designates the seat-supporting bars, which are secured at their forward ends to the frame $A^2$ and pass rearwardly and upwardly over the frame-rod $A'$ and then backwardly in a horizontal line a sufficient distance to form a suitable support for the seat. A cross-head $s$ connects the two said bars in the center of the frame-rod $A'$ and through which the king-bolt T passes for more firmly securing these parts together. The shafts U are secured to the frame-rod $A^2$ by means of suitable couplings $U'$, which are adjustable on the said frame-rod $A^2$ and which may be moved toward the center to form a tongue when it is desired to use two or more horses. A suitable cross-rod $U^2$ connects the two shafts U, and to which is suitably secured a singletree V. A bracing-bar $V'$ is secured to the pivot-bolt of the singletree at one end and at its other end to the frame-bar $A'$ by means of the king-bolt $s$.

It will thus be seen that I have constructed a frame which is composed of very few parts and simple in construction and at the same time strong and durable and presents a pleasing appearance to the eye.

Various slight changes in form and construction might be made without departing from the spirit and scope of my invention. Hence I do not desire to limit myself to the particular form shown and described.

Having thus described my invention, what I claim, and desire to secure by Letters Patent, is—

1. In an agricultural implement, the combination of a supporting-frame, a series of tool-carrying bars carried thereby, and means for reciprocating said bars to regulate the distance between the teeth, substantially as described.

2. In an agricultural implement, the combination of a main frame, a tool-carrying frame hinged thereto, a series of tool-bars adjustably mounted in said frame, and means for imparting opposite longitudinal movement to said tool-bars.

3. The combination with the supporting-frame, a tool-carrying frame hinged thereto, triple tool-bars carried by said frame and means for effecting the lateral adjustment of said tool-bars, to regulate the distances between the teeth, substantially as described.

4. The combination with a main supporting-frame, of a tool-carrying frame, triple tool-bars supported in said tool-carrying frame adapted to carry the teeth, means for imparting opposite longitudinal movement to the upper and lower tool-bars, and means for holding the intermediate bar stationary, substantially as described.

5. The combination of the main supporting-frame, a tool-carrying frame hinged thereto, triple tool-bars supported in said tool-carrying frame, teeth adjustably secured on said bars in such positions that the lateral movement of the upper bar in one direction and a similar movement of the lower bar in the opposite direction will increase or diminish the distances between said teeth, and means for imparting such movement to the said bars simultaneously, substantially as described.

6. The combination of a main supporting-frame, a tool-carrying frame hinged thereto, multiple tool-bars supported in said tool-carrying frame, means for holding an intermediate tool-bar stationary and a lever for shifting upper and lower tool-bars simultaneously in opposite directions, substantially as described.

7. The combination in an agricultural implement of a main supporting-frame, a tool-carrying frame hinged thereto, triple transverse bars supported in said frame, means for holding the intermediate bar rigid with its carrying-frame, a lever pivoted to one end of the intermediate bar, connecting-rods fulcrumed to the lever above and below its pivotal point respectively the free ends of which are secured to the upper and lower tool-bars respectively, substantially as described.

8. The combination in an agricultural implement of a main supporting-frame, a tool-carrying frame hinged thereto, triple transverse bars supported in said frame, means for holding the intermediate bar rigid with its carrying-frame, a lever pivoted to one end of the intermediate bar, connecting-rods fulcrumed to the lever above and below its pivotal point respectively the free ends of which are secured to the upper and lower tool-bars respectively, and means for locking said lever in its adjustable position, substantially as described.

9. The combination of the main frame, the tool-carrying frame hinged thereto, triple tool-bars supported in said carrying-frame, means for holding the intermediate tool-bar stationary, a lever pivoted to one end of the stationary bar, and connections between the said lever and the upper and lower tool-bars whereby a lateral adjustment of the same in opposite directions may be effected simultaneously, substantially as described.

10. The combination of the main frame, the tool-carrying frame hinged thereto, triple tool-bars supported in said carrying-frame, means for holding the intermediate tool-bar stationary, a lever pivoted to one end of the stationary bar, and connections between the said lever and the upper and lower tool-bars whereby a lateral adjustment of the same in opposite directions may be effected simultaneously, and means for locking said bars in their adjusted positions, substantially as described.

11. The combination of the main supporting-frame, a supplemental frame hinged thereto, triple tool-bars carried by said supplemental frame, means for holding the intermediate bar stationary, a lever pivoted to the said stationary bar at one end, connections between the said lever and the upper and lower bars respectively whereby they may be shifted in opposite directions upon the operation of said lever, and a segmental rack and spring-pawl for retaining said bars in their adjusted positions, substantially as described.

12. In an agricultural implement, the combination of a main supporting-frame, a supplemental frame hinged thereto, supporting-plates carried by said supplemental frame for the support of the tool-bars, and means for adjusting said supporting-plates to change the pitch of the tool, substantially as described.

13. The combination of a main supporting-frame, a supplemental frame hinged thereto, supporting-plates pivoted to the ends of said supplemental frame, openings provided in said supporting-plates for the reception and support of the tool-bars, and means for adjusting the same to change the pitch of the teeth, substantially as described.

14. The combination of the main supporting-frame, a tool-carrying frame comprising a series of rearwardly-extending bars hinged to the main frame at their forward ends, twin plates embracing the other ends of said bars, means for adjusting the said plates for changing the angles of the tool-bars, and transversely-arranged tool-bars carried by the said twin plates, substantially as described.

15. A frame for agricultural implements consisting of a rectangular frame arranged at an angle to the vertical plane of the machine, suitable draft-bars secured to the forward downwardly-disposed bar of said frame, pivoted supporting-wheels adjustably mounted on the upper forward bar of said frame, brace-bars connecting the wheel-standards and the front frame-bar, a supplemental tool-carrying frame hinged to said main frame and transversely-arranged tool-bars carried by said supplemental frame, substantially as described.

16. In an agricultural implement, a main supporting-frame, a tool-carrying frame hinged thereto, an operating-lever loosely mounted on the main frame, a segmental toothed rack rigidly secured to said main frame, adapted to be engaged by the operating-lever, a slotted bar swiveled to the tool-carrying frame, a pair of bars embracing the said slotted bar on both sides thereof and pivoted at their upper ends to an arm on the operating-lever, a collar rigidly secured to the central bar at its base, a collar rigidly secured to the outer bars by means of a bolt which passes through the slot of the central bar and a tension-spring interposed between the two collars, whereby a direct but yielding pressure may be exerted on the tool-carrying frame, substantially as described.

17. The combination with the main supporting-frame, of a tool-carrying frame hinged thereto, a toothed segment and operating-lever carried by the main frame, a bar, M', swiveled at its lower end to the tool-carrying frame, a short slot, $M^3$, located in about the center of said bar, a slot, $M^2$, formed in the upper part of said bar, a pair of bars, M, embracing the bar, M', on each side thereof and pivoted at their upper ends to an arm, L', of the operating-lever, a bolt, $m^3$, connecting the bars, M, and passing through the slot, $M^2$, a collar, $m^5$, a bolt, $m^4$, connecting said collar to the bars, M, and passing through the short slot, $M^3$, a collar, $M^6$, carried by the lower part of bar, M', and a coiled spring, O, interposed between the two collars, $M^5$, $M^6$, substantially as described and for the purpose stated.

18. The combination of a main supporting-frame, a tool-carrying frame hinged thereto, mechanism connecting the main frame and tool-carrying frame for raising and lowering same and exerting downward pressure on the center of the tool-carrying frame, the hinged supporting-bars, F, at the extreme ends of the said tool-supporting frame, lifting-levers, Q, provided with a ratchet-and-pawl mechanism, secured to the main frame, A, at each end thereof, and the chains, R, connected with the lifting-levers, Q, and the bars, F, of the tool-carrying frame, substantially as described and for the purpose stated.

In witness whereof I have hereunto set my hand this 10th day of May, A. D. 1898.

SAMUEL L. ALLEN.

Witnesses:
FRANK D. GRAHAM,
HORACE PETTIT.